June 16, 1964 H. WEBER ETAL 3,137,456
RAPID ROLL CHANGER
Original Filed Jan. 23, 1959
5 Sheets-Sheet 1
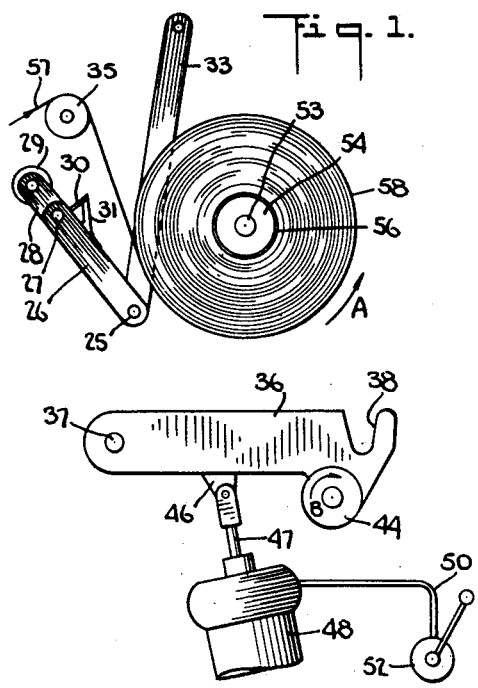
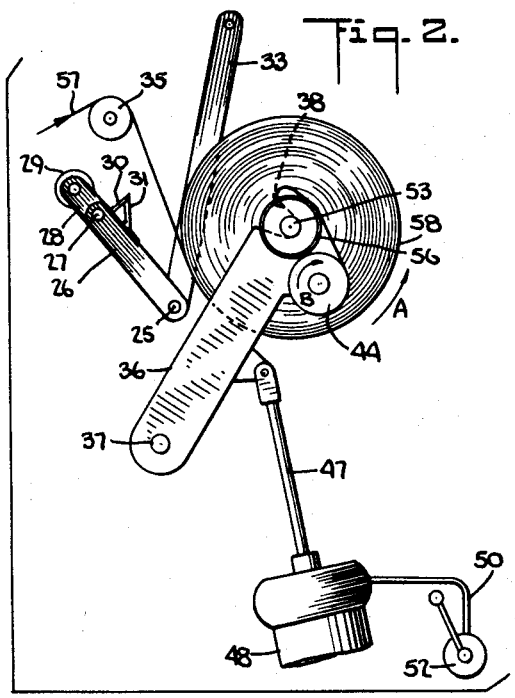
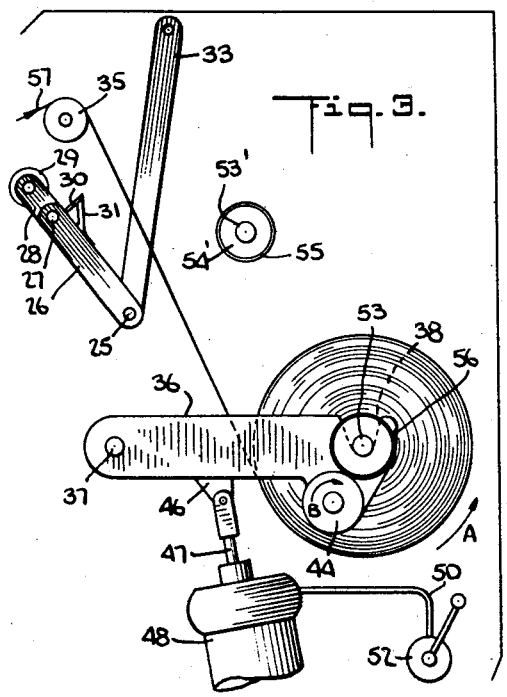
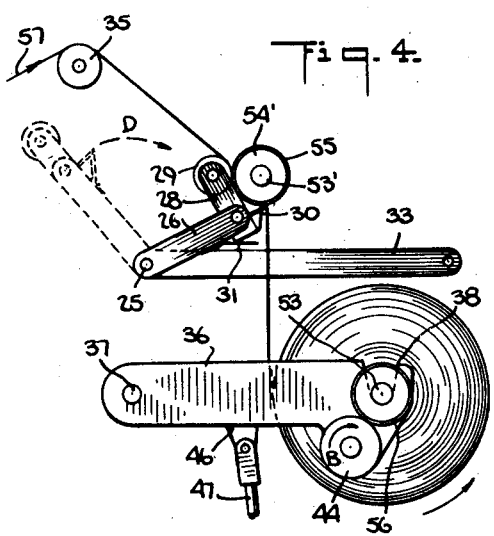

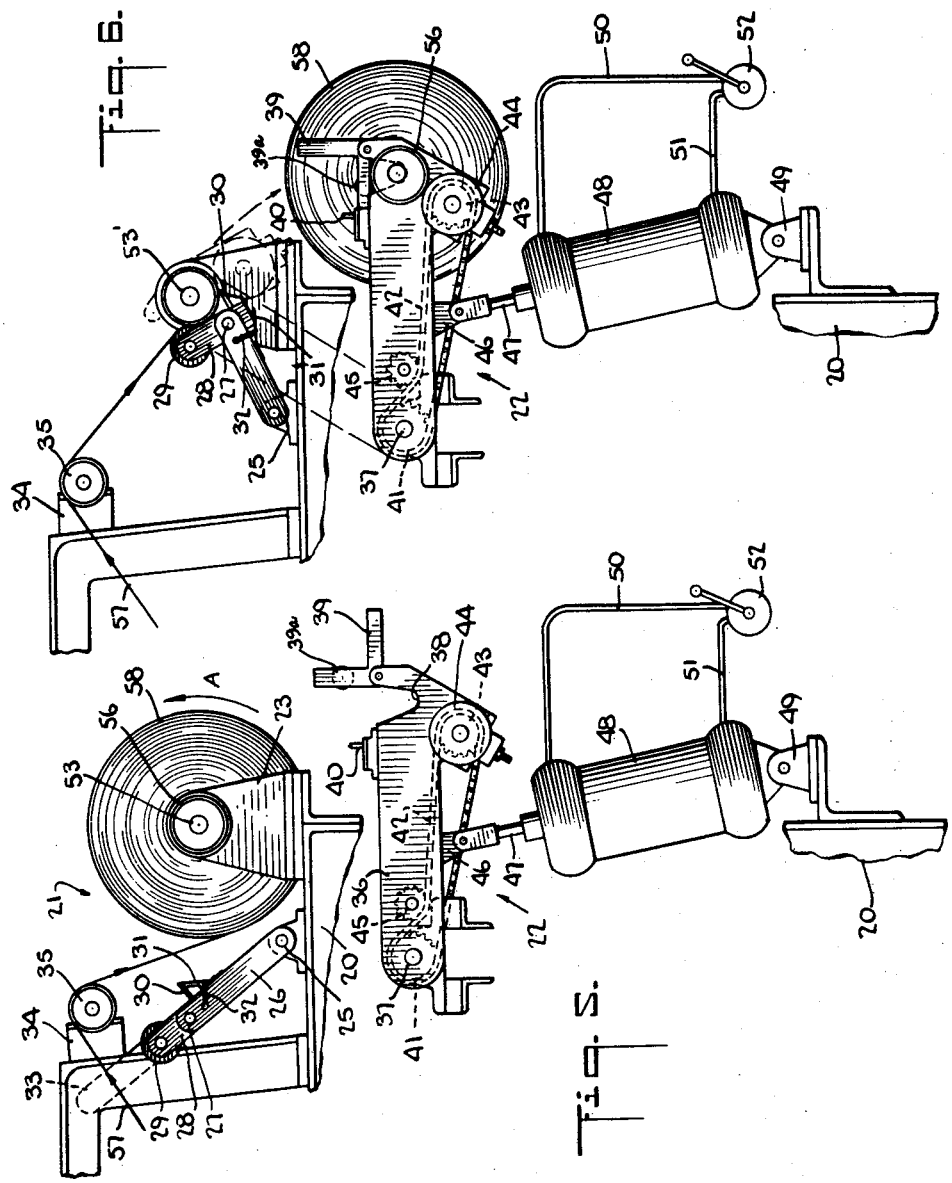

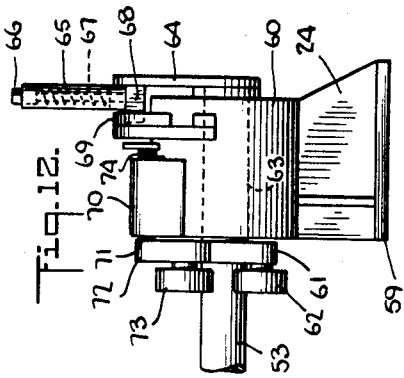
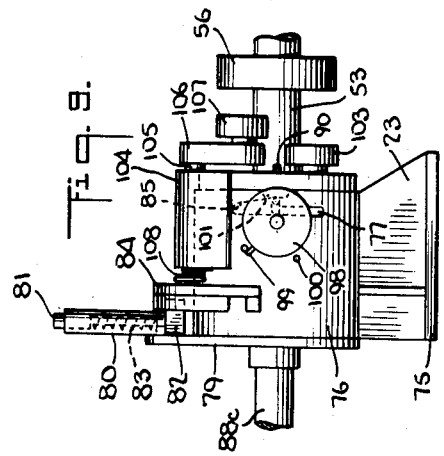
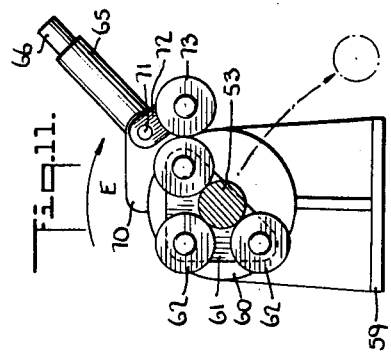
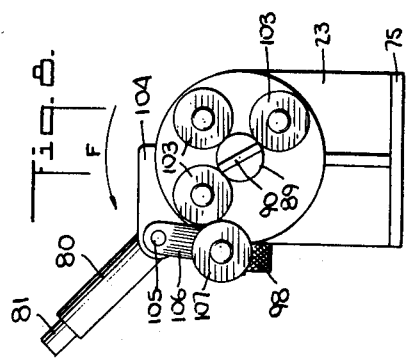
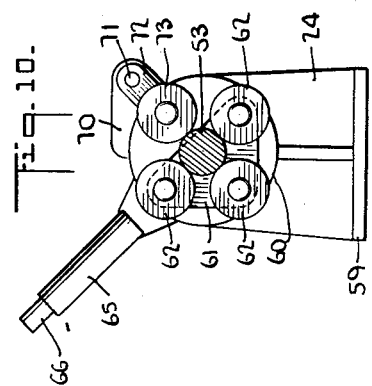
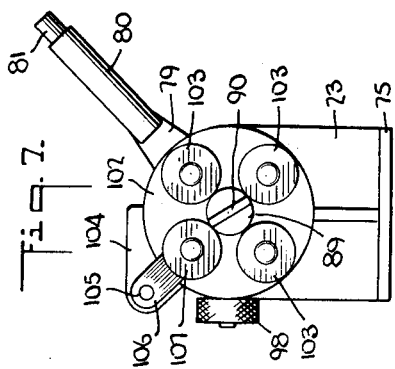

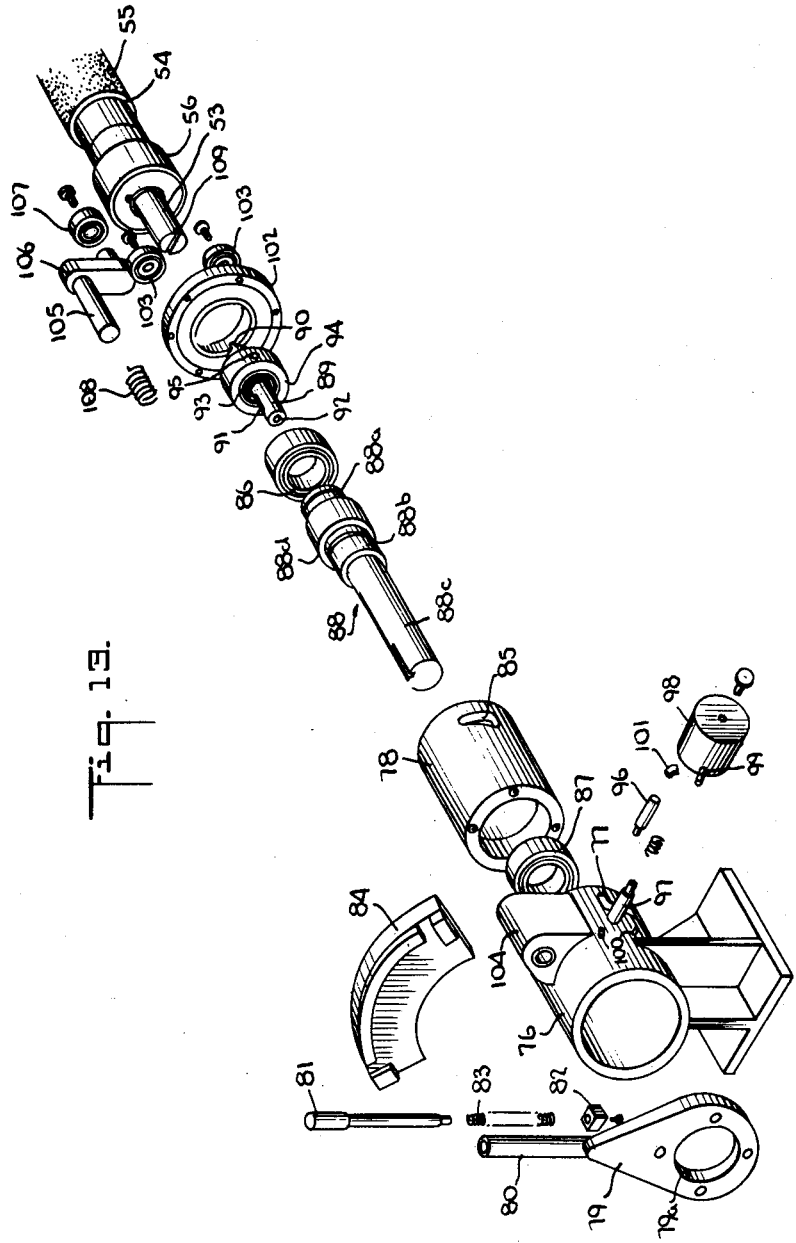

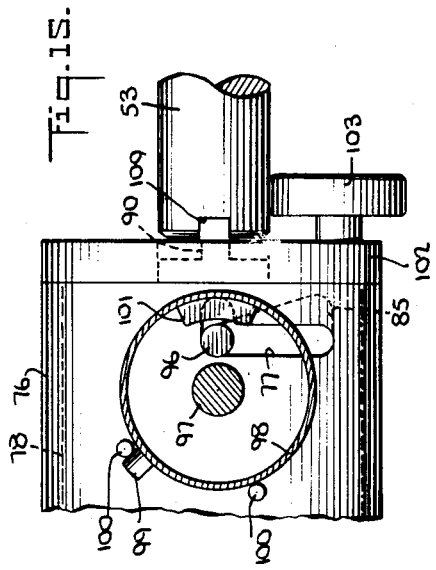
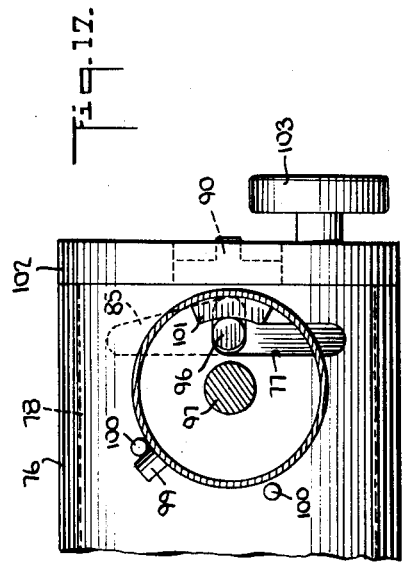
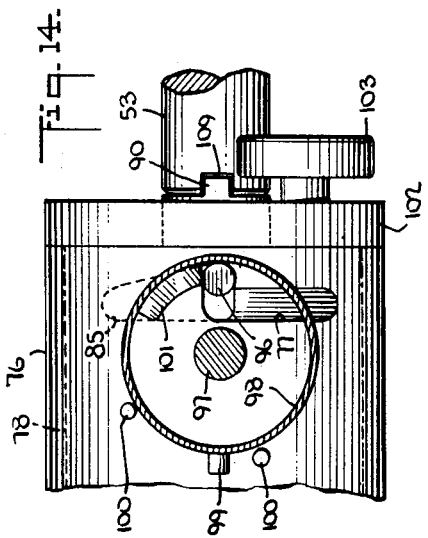
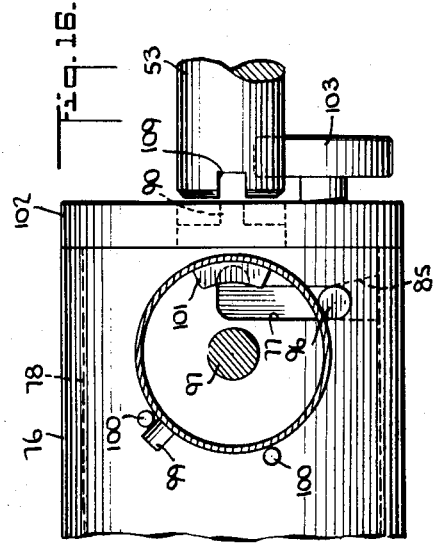

United States Patent Office 3,137,456
Patented June 16, 1964

3,137,456
RAPID ROLL CHANGER
Harold Weber, Bloomfield, Harold J. Brown, Lyndhurst, and Arthur T. Blake, North Arlington, N.J., assignors to Celanese Corporation of America, New York, N.Y., a corporation of Delaware
Original application Jan. 23, 1959, Ser. No. 788,593, now Patent No. 3,039,712, dated June 19, 1962. Divided and this application Apr. 30, 1962, Ser. No. 198,661
2 Claims. (Cl. 242—56)

This invention relates to wind-up machines for film, sheet and other elongated materials, and in particular to a process for effecting a rapid exchange of spools in such machines.

In the continuous manufacture of relatively thin plastic film or sheeting, the material upon leaving the casting wheel or other film-forming device is wound onto a core into the form of a roll. When the roll reaches a predetermined diameter, it is usually necessary to interrupt the wind-up operation, sever the wound-up film from the source thereof, remove the completed roll from the wind-up machine, and substitute an empty core in the wind-up machine onto which the subsequently formed film is then wound. Of course, this procedure is repeated each time a roll of film reaches the aforesaid predetermined diameter, which in itself makes for a considerable waste of time and inefficiency as far as the overall operation is concerned. Moreover, the above referred to replacement of rolls of film by empty cores has heretofore always been effected manually. If the operation is carried out at relatively low speeds, a highly efficient and trained operator might be able to perform the replacement operation and to permit the wind-up operation to resume without wasting too much time and without bringing about a serious loss of tension in the film. At the extremely high speeds required by modern manufacturing techniques, however, manual replacement of rolls by empty cores without serious interruptions and loss of film tension has been found to be substantially impossible.

It is, therefore, an important object of the present invention to provide a roll transfer process which will enable the aforesaid drawbacks and disadvantages to be completely avoided.

Another important object of the present invention is, consequently, a wind-up process which permits film or sheeting taken from a continuous manufacturing source thereof to be wound in succession on a plurality of cores or spools without requiring any interruption of the winding operation.

A related object of the present invention is the provision of a wind-up method as aforesaid facilitating a continuous winding operation at uniform tension of the film or sheeting even while a filled spool is being replaced by an empty spool to be filled thereafter.

Yet another object of the present invention is to provide process technique which, during the removal of a filled spool and replacement thereof by an empty spool, will sever the source film or sheeting from the wound-up portion thereof and will concurrently attach the severed end of the source part of the film to the empty spool without any folding back of said end and without any bunching, shirring or wrinkling of the material.

It is a further object of the present invention to provide a novel and extremely efficient process of replacing a film-filled spool in a winding machine with an empty spool, which does not entail any interruption of or other interference with the winding operation and which does not require the services of specially trained or skilled operators.

Concurrently it is an object of the present invention to provide a process concept which embodies novel means for supporting and driving a spool during the winding operation, which means can be easily shifted from the spool-driving position thereof to a spool-discharging position to permit the replacement of a filled spool by an empty spool.

More specifically, the objects of the present invention are attained by providing a roll changer system which includes two spooling stations or devices, one of which may be called a main or permanent winding mechanism while the other may be called an auxiliary or temporary winding mechanism, the latter being movable relative to the former and being normally inoperative but held in readiness to take up the winding operation when the roll on the permanent winding mechanism has reached a predetermined size. Having taken over the winding operation while at the same time removing the filled spool from the main winding mechanism, the auxiliary winding mechanism continues the wind-up operation until the next empty spool has been received in the driving arrangement of the main winding mechanism. Thereafter a full width serrated knife pivotally mounted adjacent the main winding mechanism is brought into engagement with the film to sever the source portion thereof from that portion constituting the said roll wound on the first spool, and simultaneously therewith a pressure roller presses the leading end of the source portion against the core of the second spool, at which point the aforesaid driving arrangement is reactuated and the permanent winding mechanism again resumes its operation.

The foregoing and other objects, characteristics and advantages of the present invention will become more fully clear when the following detailed description thereof is read in conjunction with the accompanying drawings, in which:

FIGS. 1 to 4 are purely diagrammatic illustrations of the successive steps of the roll changing process according to the present invention:

FIG. 5 is a fragmentary end elevational view of a rapid roll changer of a wind-up machine according to the present invention, the main winding mechanism thereof being in operation and the auxiliary winding mechanism being inoperative;

FIG. 6 is a similar view of the machine showing the fully wound roll transferred to the auxiliary winding mechanism and the starting of a new roll in the main winding mechanism;

FIGS. 7 and 8 are end elevational views of the active part of the driving arrangement of the main winding mechanism of the machine in its roll supporting and discharging positions, respectively;

FIG. 9 is a fragmentary side elevational view of the structure shown in FIGS. 7 and 8;

FIGS. 10 and 11 are end elevational views of the idler part of the aforesaid driving arrangement of the main winding mechanism in its roll supporting and discharging positions, respectively;

FIG. 12 is a fragmentary side elevational view of the structure shown in FIGS. 10 and 11;

FIG. 13 is an exploded detail view of the drive chuck structure shown in FIGS. 7 to 9; and FIGS. 14 to 17 are fragmentary side elevational views of the drive chuck in various stages of operation.

Referring first to FIGS. 5 and 6 of the drawings, it will be seen that the machine according to the present invention comprises a rigid frame 20 on the upper part of which is disposed a main or permanent winding mechanism 21 and on the lower part of which is arranged an auxiliary or temporary winding mechanism 22. The main winding mechanism comprises a drive assembly 23 and an idler assembly 24 (shown in FIGS. 10 to 12) disposed at locations on the frame 20, spaced apart by the length of the spools. Both the drive assembly, to which power is supplied by a motor or like means (not shown) through the intermediary of an over drive or slipping clutch (not shown), and the idler assembly will be described in greater detail hereinafter.

Pivotally mounted on the frame 20 on a suitable axle or trunnion means 25 and for joint movement is a lever pair 26 (only one of which is shown), one of the levers 26 being located adjacent the drive assembly 23 and the other lever 26 being located adjacent the idler assembly 24. Articulated intermediate its ends through the intermediary of axle or trunnion means 27 to the upper ends of the levers 26 is a second pair of levers 28 on the uppermost ends of which is journaled a rubber or rubber covered roller 29 the length of which is substantially coextensive with the space between the drive and idler assemblies 23 and 24. Fixedly carried by the levers 28 adjacent their ends remote from the roller 29 is a serrated knife or cutter 30 which also extends along the entire space between the drive and idler assemblies and, when the levers 26 are in the position shown in FIG. 5, is covered by a safety shield 31 hingedly carried by the levers 26 and biased so as to cover the cutter 30 by means of a spring 32. The entire lever assembly 26–28 is connected with an operating handle 33 by means of which it may be pivoted about the axis 25 into the position shown in FIG. 6. Rotatably journaled in suitable bearings 34 at the top of the machine frame 20 is an idler roll 35 the length of which is coextensive with the space between the drive and idler assemblies 23 and 24 and the purpose of which will become clear presently.

The auxiliary winding mechanism 22 comprises a bifurcated cradle frame 36 mounted at one end for vertical reciprocal angular movement on axle or trunnion means 37. At the other end, each of the arms of the cradle frame 36 is provided with a recess 38 and with a pivotally mounted latch member 39 (only one of which is shown), each latch member 39 when swung to the position shown in FIG. 6 being releasably locked in position across its respective recess 38. In order to provide for ease of mandrel rotation, friction reducing means, such as rotatable rollers 39a (only one of which is shown), are provided in the recesses 38 and on the latch member 39. A pair of push button or similar devices 40 for releasing latch members 39, respectively, is mounted on the respective arms of the cradle frame 36.

Suitably mounted on one arm of the cradle frame 36 is a sprocket wheel or like transmission element 41 driven by a motor or like means (not shown) through the intermediary of a slipping or overdrive clutch (not shown) and about which passes an endless chain or belt 42 which at its opposite end passes over a similar wheel or transmission member 43 coaxially disposed with a frictional driving wheel 44 arranged adjacent the outer surface of the same one of the arms of the cradle frame 36. An idler wheel 45 carried by the said cradle arm maintains the proper tension in the chain or belt 42. Extending downwardly from the cradle frame 36 is a bracket structure 46 to which is articulated the upper end of a piston rod 47 connected to the piston (not shown) of a reversible pneumatic motor 48 pivotally mounted on a bracket 49 affixed to the machine frame 20. A pair of conduits 50 and 51 controlled by a reversible valve 52 communicate with the opposite ends of the cylinder of the pneumatic motor 48 to enable compressed air or a similar pressure fluid to be admitted selectively into the latter so as to reciprocate the cradle frame 36 between its solid-line and broken-line positions illustrated in FIG. 6.

It is to be noted that the auxiliary winding mechanism operates as a center winding mechanism and transmits torque to the wound spool through its mandrel in the same manner as the spool was wound by the main winding mechanism. The continuation of center winding during the spool transfer and until the spool is severed keeps the spool tension uniform until the completion of the winding operation.

The rapid roll changing process according to the present invention, as carried out by parts of the winding machine illustrated in FIGS. 5 and 6 will now be explained with reference to FIGS. 1 to 4.

As is well known, each spool on which the plastic film or sheeting is to be wound comprises a mandrel 53 on which is mounted a cardboard core 54 the outer surface of which is covered by a double-faced, pressure sensitive adhesive tape 55 (see FIG. 3), the mandrel adjacent one end thereof carrying a friction roller 56. Assuming that a spool is supported by the drive and idler assemblies 23 and 24, as more fully explained hereinbelow with respect to FIGS. 7 to 12, the plastic film or sheeting 57 coming from the casting wheel of the film manufacturing machine (not shown) passes over the idler roll 35 and is wound into the form of a roll 58 on the spool 53–54 which is being rotated by the drive assembly 23 of the main winding mechanism 21 in the direction of the arrow A (FIGS. 1 and 5).

When the roll 58 attains the desired size, i.e., when a predetermined length of the film 57 has been wound onto the core 54, the valve 52 is actuated to admit compressed air via line 51 into the bottom end of the pneumatic motor 48, whereby the piston rod 47 thereof and thus the cradle frame 36 are raised into the position indicated in FIG. 2 (and in broken lines in FIG. 6) so that the recessed portions of the cradle arms embrace the mandrel 10 adjacent its opposite ends, with the friction wheel 44 of the cradle frame in engagement with the friction roller 56 of the spool mandrel 53. The latches 39 (not shown in FIGS. 1 to 4) are now moved to their recess-locking positions (FIG. 6) and the main drive mechanism de-actuated with the drive and idler assemblies moved to their spool discharging positions, in a manner still to be described. This, however, does not bring about a cessation of the rotation of the roll 58, since the driving wheel 44, which is driven in the direction of the arrow B via the chain 42 by the transmission element 41, is in frictional driving contact with the roller 56 and thus ensures that the mandrel 53 and therewith the roll 58 continue to rotate in the direction of the arrow A.

At this stage, with the auxiliary winding mechanism operative and the main winding mechanism inoperative, the valve 52 is returned to its original condition so as to admit pressure fluid into the upper end of the pneumatic motor 48, thereby effecting a retraction of the piston rod 47 and a lowering of the cradle frame 36 together with the roll 58 held thereby (FIG. 3). It will, therefore, be noted that as a new spool, the mandrel of which is designated 53′ in FIG. 3, is being inserted into the drive and idler assemblies of the main or permanent winding mechanism, the film 57 is still being wound onto the spool 53–54 now being held by the cradle arms of the frame 36.

The operator, having first returned the drive and idler assemblies to their spool supporting positions, now grabs the handle 33 and swings it in the direction of the arrow C, whereby the lever system 26–28 is displaced in the direction of the arrow D (FIG. 4). When the pressure roller 29 engages that stretch of the film 57 located between the idler roll 35 and the roll 58 and presses a part of this stretch against the adhesive outer surface of the tape 55 mounted on the new core 54′, continued downward movement of the handle 33 effects a relative angular motion between the levers 26 and the levers 28 about the axis of the pivot means 27, which immediately brings the serrated edge of the cutter 30 into contact with the film 57 and severs the same over the entire width thereof, the guard 31 at this time having been swung out of the way, of course, by the camming action of the lowermost ends of the levers 28 (see FIG. 6). The severed leading end of the source portion of the film or sheet 57 is thus firmly attached to the new core 54′, thereby causing the film 57 to be wound thereonto into the form of a new roll.

As soon as this new winding operation is under way, the lever 33 is returned to its starting position, the latches 39 are opened, and the roll 58 removed for packing and shipment or storage as the case may be.

The drive and idler assemblies employed in the main winding mechanism referred to hereinabove are more specifically illustrated in FIGS. 7 to 17. Referring first to FIGS. 10 and 12, it will be seen that the idler assembly 24 comprises a base 59 supporting a bearing block or housing 60 at the inner face of which, i.e., at that face turned toward the drive assembly 23, is disposed a substantially triangular carrier plate 61 which supports at its three corners three rotatable rollers 62 and is affixed to one end of a shaft 63 rotatably journaled in the housing 60. Connected to the opposite end of the shaft 63 is an arm 64 to the free end of which is connected a hollow operating handle 65 in the interior of which is slidably mounted a push button rod 66 surrounded by a spring 67 tending to bias the rod outwardly of the handle 65. The lower end of the rod 66 carries a braking or locking element 68 engageable with a cooperating friction element 69 fixedly mounted on the housing 60. Positioned atop the housing 60 inwardly of the friction element 69 is a further bearing member 70 in which is journaled a shaft 71 carrying at its outer most end at arm 72 which at its lower end carries a roller 73. A torsion spring 74 biases the shaft in a clockwise direction in the view seen in FIGS. 10 and 11.

Thus, if the operation handle is disposed in the position shown in FIG. 10, with the braking arrangement 68-69 locking it and the carrier plate 61 in the indicated position, and with the arm 72 biased as shown by the spring 74, the roller 73 and the three rollers 62 are disposed at the four corners of a square and thereby define a bearing location for the mandrel 53 of a spool. Should it be desired to release the mandrel from the bearing rollers, the push button 66 is depressed to release the braking element 68 from the friction element 69, and the handle 65 is then moved angularly in the direction of the arrow E (FIG. 11). This rotates the plate 61 about the axis of the shaft 63 and causes the previously uppermost roller 62 to engage the roller 73 and displace the same with its arm 72 outwardly of the housing 60 (counterclockwise in the view seen in FIGS. 10 and 11). The mandrel 53 can now be removed from between the rollers 62, as shown in phantom outline in FIG. 11. The rollers can be locked in this position by releasing the button 66, and when they are to be returned to the position of FIG. 10, the button 66 is again depressed to permit angular movement of the handle 65 and shaft 63 in the direction opposite to the arrow E.

Referring now to FIGS. 7 to 9 and 13 to 17, it will be seen that the drive assembly 23 comprises a base 75 supporting a bearing block or housing 76 shaped in the manner of a cylindrical barrel and provided with diametrically opposed and oppositely extending elongated L-shaped slots 77, extending therethrough (only one is shown in FIG. 13), the short horizontal sections of which are aligned with one another. Angularly movable in the bearing block 76 is an inner barrel 78 to the rear end of which is connected by means of screws or bolts (not shown) an arm 79 provided with an opening 79a and carrying at its upper end a hollow operating handle 80. (In this description, "front" and "rear" directions are designated as they would appear from the view of FIGS. 7 and 8, so that "front" means closer to the mandrel and "rear" means further removed therefrom.) Arranged slidably within the handle 80 is a push button rod 81 carrying a braking element 82 at its lowermost end and surrounded by a spring 83 which tends to bias it outwardly of the handle so as to bring the braking element 82 into engagement with the operative surface of a cooperating friction element 84 fixedly mounted on the block or housing 76. The structure 79-84 thus is essentially the same as the structure 64-69 described hereinabove with respect to the idler assembly 24 and serves to lock certain parts of the drive assembly still to be described in any adjusted angular position.

Fixedly mounted within and at an intermediate position and at the rear ends, respectively, of the inner barrel or sleeve 78, which is provided adjacent its front end with a pair of diametrically opposed and oppositely extending, substantially triangular slots 85, extending therethrough (only one of which is shown), are two ball bearings 86 and 87 which in turn support the front end position 88a and intermediate portion 88b of a shaft member 88, the rear end portion 88c of which extends freely through the opening 79a in the locking handle arm 79 and is adapted to be connected to the aforesaid slipping clutch of the main drive mechanism. Front end and intermediate portions 88a and 88b are collared to a greater diameter than rear end portion 88c to fit rotatably within bearings 86 and 87, respectively. Between 88a and 88b is a shoulder 88d, of still greater diameter, against which the bearings 86 and 87 abut. The bearings thus permit rotation and inhibit any axial displacement of the shaft member 88 relative to the inner barrel 78 and the block or housing 76.

The shaft member 88 is provided at its front end with an axial bore (not shown) in which is received the shaft portion 89 of a drive dog 90, the shaft portion 89 being provided with a key or keyway 91 designed to cooperate with a corresponding keyway or key (not shown) provided interiorly of the bore of the shaft member 88. An axial bore 92 is formed in the rear end of the drive dog shaft portion 89 which is adapted to receive one end of a compression spring (not shown) the other end of which is seated against the innermost end of the bore in the shaft member 88 and the purpose of which is to bias the drive dog forwardly into its roll driving position. The shaft portion 89 extends rotatably through a ball bearing 93 the inner race of which is fixed thereto and the outer race of which is fixedly connected to the inner periphery or an annular retracting ring 94. Retracting ring 94 is positioned within and at the front end of inner barrel 78, adjacent to bearing 86. The retracting ring 94 is provided in its outer periphery with a threaded recess 95 (only one is shown although two may be provided at diametrically opposed locations) into which is screwed a drive dog shifting pin 96 extending through the associated slots 77 and 85 in the bearing block or housing 76 and the inner barrel 78, respectively. If a second such pin is provided, it too extends through its associateed slots 77 and 85, but its function will only be one of balance and it will play no part other than the actual shifting of the drive dog 90. Adjacent that one of the slots 77 in the housing 76 through which the active pin 96 extends is located a pin 97 on which is rotatably mounted a knob 98 the angular movements of which are limited by the coaction of a projection 99 on the knob 98 and a pair of spaced abutments 100, on the bearing block housing 76. The knob 98 is hollow and carries on its interior surface a small arcuate or segmentally shaped lock-out element 101 adapted to engage the active shifting pin 96 for a purpose which will be explained more fully hereinafter.

Affixed to the front end of the inner barrel 78 and angularly displaceable therewith is an annular plate 102 to the outer face of which are rotatably connected three rollers 103 substantially identical to the rollers 62 of the idler assembly, the rollers 103 also being arranged at the three corners of a right triangle. Disposed atop the housing 76 is a further bearing structure 104 in which is journaled a shaft 105 carrying at its front end an arm 106 on the lower end of which is rotatably mounted a roller 107, a torsion spring 108 (FIG. 13) biasing the shaft 105 in a clockwise direction in the view shown in FIGS. 7 and 8.

Thus it will be understood that when the handle 80 is unlocked by depression of the push button rod 81 and moved through an angle of 90° in the direction of the arrow F (see FIG. 8), the inner barrel 78 and therewith the annular plate 102 will be rotated through the same angle, whereby the previously uppermost bearing roller 103 will engage the roller 107 and cam the same outwardly relating to the bearing block 76 so as to enable the mandrel to be removed from these bearing rollers in the direction indicated in phantom outline in FIG. 8.

The required retraction of the drive dog 90 from the position of FIG. 14, i.e., out of the driving groove 109 of the mandrel 53, is effected during the first 45 degrees of the angular movement of the handle 80, by virtue of the fact that when the inner barrel 78 is rotated thereby, the concurrent movement of the slot 85 causes the pin 96 to be moved rearwardly along the horizontal portion of the L-shaped slot 77 to the position indicated in FIG. 15, which rearward movement draws the retracting ring 94 and therewith the bearing 93 and drive dog shaft portion 89 rearwardly against the force of the spring seated in the bore 92 of the shaft portion 89 and the bore in the front end of the shaft 88. The drive dog is locked against outward movement at this time by manual rotation of the knob 98 to position the lock-out segment 101 across the said horizontal portion of the slot 77.

The second half of the angular movement of the handle 80 ensures that the pin 96 is drawn along the linear vertical portion of the slot 77 so as to prevent any accidental protraction of the drive dog 90 during the unloading of the mandrel 53 and roll 58, this second half of the handle movement thus resulting in the completion of the rotation of the disc or plate 102 with the rollers 103 to the unloading position shown in FIG. 8. This stage is illustrated in FIG. 16. Upon return movement of the handle 80 through an angle of 45°, the pin 96 is returned along the slot 77 to the position illustrated in FIG. 17, at which point protraction of the drive dog 90 is still inhibited by the lock-out segment 101 of the knob 98. A new mandrel may now be mounted on the bearing rollers 103, whereupon, rotation of the handle 80 through another 45° so as to return the slot 85 to the position shown in FIG. 14, permits the drive dog 90 to be protracted into engagement with the groove 109 of the said new mandrel.

The complete mandrel-changing process according to the present invention, therefore, is as follows:

When a mandrel 53 is to be supported and rotated, the drive assembly 23 is in the condition illustrated in FIGS. 7 and 14, in which the drive dog 90 is protracted into a drive slot 109 provided, for example, in that end of the mandrel 53 adjacent which the friction roller 56 is located, while the three rollers 103 and the roller 107 are located essentially at the four corners of a square about and in bearing engagement with the mandrel 53. Driving power is supplied to the drive dog 90 via shaft 88. When the roll 58 has attained the desired size, the operator first actuates the valve 52 to raise the cradle frame 36 until the opposite mandrel ends are received in the recesses 38. The latches 39 are now moved to their locking positions, the drive roller or wheel 44 now being in contact with the roller 56. The operator then depresses the push buttons 66 and 81 and pulls the handles 65 and 80 toward him, i.e., toward the front of the machine (the arrow E and F actually designate the same direction), through an angle of 45°, at which point the mandrel drive dog 90 will be fully retracted. There will be no interruption in the rotation of the roll 58, however, since the roller 56 is in frictional engagement with the chain-driven wheel 44. As soon as the handles 65 and 89 have been moved through the final 45° of their angular movement, the knob 98 having been meanwhile moved to its locking position, the operator releases the push buttons, locking the handles and therewith the bearing rollers 62–72 of the idler assembly 24 and the bearing rollers 103–107 of the drive assembly 23 in their roll-discharging or unloading positions. The valve 52 is now reversed to lower the cradle frame 36 and the still rotating roll 58 held thereby, whereafter the handles are moved back through an angle of 45°, at which point the condition of FIG. 17 will obtain. A new mandrel 53' is now mounted in the idler and drive assemblies with its opposite ends supported between the bearing rollers 62–73 and 103–107, respectively. The handles are then returned to their starting positions and the knob 98 is returned to its starting position, permitting the drive dog 90 to be protracted by its spring into the groove 109 of the new mandrel so as to set the latter into rotation. Thereafter the operating handle 33 is drawn forward, causing the pressure roller 29 and the cutter 30 to be actuated as previously described. The source portion of the film or sheeting 57 is now being wound on the new mandrel 53', and the above procedure will be repeated as soon as the new roll is sufficiently large.

This application is a division of our copending application, Serial No. 788,593, now Patent No. 3,039,712.

It is to be understood that the foregoing detailed description is given merely by way of illustration and that many variations may be made therein without departing from the spirit of our invention.

Having thus described our invention, what we desire to secure by Letters Patent is:

1. A process for winding film material, which comprises positioning a first mandrel with core thereon at a first location, applying a first driving force to said mandrel without directly contacting said core to withdraw film material from a source and wind said material on said core, swinging along a substantially arcuate path a second driving force from a second location to said first location to drive said first mandrel without directly contacting said core and said film material wound thereon, simultaneously interrupting the driving action of said first driving force, swinging along said same arcuate path said second driving force and said first mandrel with core and any desired amount of wound film material thereon while said first mandrel is being continuously driven by said second driving force, said last-mentioned swinging action moving said second driving force and said first mandrel with core and wound film material thereon from said first location to said second location, positioning a second mandrel with core thereon at said first location and by said first driving force driving said second mandrel without directly contacting the core thereon, and severing said film material along said second core and simultaneously attaching a severed end thereto so as to withdraw film material from said source and wind the same on the core on said second driven mandrel.

2. A winding process as defined in claim 1, in which the second driving force is first swung in an upward direction and said second driving force and first mandrel with core and wound material thereon are then swung in a downward direction, and also in which the film material is severed by swinging a cutting surface along a second arcuate path toward said second mandrel with core thereon.

References Cited in the file of this patent

UNITED STATES PATENTS

| | | |
|---|---|---|
| 2,537,588 | Husson | Jan. 9, 1951 |
| 2,676,764 | Aulen | Apr. 27, 1954 |
| 2,682,379 | Piper et al. | June 29, 1954 |